United States Patent Office 2,965,583
Patented Dec. 20, 1960

2,965,583

CATALYTIC STRUCTURE

Eugene J. Houdry, Ardmore, and Wilfred M. Adey, Paoli, Pa., assignors to Oxy-Catalyst, Inc., a corporation of Pennsylvania No Drawing. Continuation of application Ser. No. 442,439, July 9, 1954. This application Oct. 14, 1957, Ser. No. 689,778

13 Claims. (Cl. 252—466)

This invention is concerned with catalytic structures and methods for their production.

It has been previously found that catalytic structures of excellent properties may be prepared by providing a catalytically inert support with a thin, adherent, superficial film of a catalytic inorganic oxide such as alumina, which then may be impregnated with catalytically active metals such as platinum, palladium, nickel, etc. Catalytic structures of this type and methods for their preparation are described in United States Patent 2,742,437 of Eugene J. Houdry; in copending application Serial No. 444,275, filed July 19, 1954, now U.S. Patent No. 2,921,035, of Eugene J. Houdry, entitled Catalyst Manufacture; and in United States Patent 2,580,806 of Louis E. Malina. Excellent oxidation catalysts of high activity and durability may be prepared using this type of catalytic structure.

In a preparation of this type of catalyst, one of the chief problems is that of securing firm adherence of the film of catalytic oxide to the surface of the inert support. Since the catalytic film should have a maximum thickness of about .015", and is usually of the order of about .0005" to .006" in thickness, the production of a hard, firmly adherent film is of critical importance with respect to the life of the catalyst. A soft, poorly adherent film is quickly stripped off the surface of the support, rendering the catalyst inactive.

The difficulty of securing adherence of the film varies considerably with the character of the inert support. It has been found particularly that a certain degree of surface porosity is of great assistance in this respect. Such pores should be quite small, preferably microscopic in character, so that the film is deposited on the surface of the support and not distributed within the pores. It has been found for example, that a support composed of a dense, high quality porcelain, such as that used in the manufacture of spark plugs, is well adapted to receive the film of catalytic oxide. The microscopic surface porosity possessed by this type of porcelain apparently assists greatly in securing firm adherence of the film, and hard, adherent films of a variety of oxides such as films of catalytic alumina, catalytic beryllia, silica-alumina, and others, have been produced on this type of support.

On the other hand, the problem of securing adherence of a film of oxide to surfaces which are devoid of porosity such as to the surface of smooth metal or glass, has been found to be considerably more difficult. For example, whereas excellent films of catalytic alumina have been produced upon a porcelain support of the character described above, it has proven to be very difficult to secure the firm adherence of a film of catalytic alumina to a metal or glass surface. In the case of a metal support, the problem of maintaining adherence of the film is aggravated by the fact that, due to the large difference in the coefficients of expansion of the metal and the catalytic film, the film of oxide tends to become dislodged in use due to repeated expansions and contractions caused by alternate heating and cooling of the catalyst structure.

It has now been found that hard, adherent catalytic films may be produced upon smooth, non-porous surfaces, such as metal, glass or plastic surfaces, by using certain combinations of catalytic oxides, namely, mixtures containing catalytic alumina and catalytic beryllia or mixtures containing catalytic alumina and catalytic zirconia. While none of these oxides in themselves will produce a satisfactory film upon the surface of such a support, the mixtures of alumina with beryllia or with zirconia produce excellent results. Apparently these combinations have the ability to promote wetting of the surface, thus producing uniform adhesion. At the same time the composite film possesses hard, non-chalking properties which generally are chiefly characteristic of films composed of straight alumina.

While any smooth surface substantially devoid of porosity may be provided with a catalytic coating of these oxides, such as smooth metal, glass or plastic surfaces, care should be taken that the surface with which the film is in contact does not contain substances detrimental to the catalytic activity of the film. Some metal alloys containing iron or copper, for example, particularly at high temperatures, have a tendency to destroy the catalytic activity of catalysts prepared with these oxides. Determination of the suitability of the support in this respect can be determined by simply preparing a sample of the desired catalyst and testing its activity.

The proportions of alumina and beryllia or of alumina and zirconia may vary considerably. While generally the best results are obtained by employing equi-molecular proportions of alumina with the other oxide very acceptable results are obtained when one oxide is present in considerable excess of the other. Generally speaking, the mole ratio $Al_2O_3:BeO$ or of $Al_2O_3:ZrO_2$ should lie within the range of 1:10 to 10:1 and preferably in the range from 1:5 to 5:1.

As is well known in the art, not all forms of these oxides are catalytically active, some forms possessing little or no catalytic properties. The catalytic form of these oxides is characterized by a minute, porous structure which possesses a large internal surface area. In the case of alumina for example, the so-called alpha alumina, or corundum, possesses little internal pore volume and is catalytically inert. The so-called gamma alumina on the other hand is characterized by a large internal surface area and is recognized as being the catalytic form of alumina. The catalytic forms are generally prepared synthetically by precipitation of a gel from a solution, followed by drying and then heating the gel at a controlled temperature to remove hydrated water. Catalytic alumina, for example, may be prepared synthetically by precipitating an alumina gel from a solution of an aluminum salt, drying the gel and thereafter heating carefully at a temperature preferably no higher than about 1500° F. to expel the hydrated water and to produce the substantially anhydrous or partially hydrated oxide which is the catalytically active or so-called adsorbtive form of alumina. Catalytic beryllia or zirconia may be prepared synthetically in a similar manner. Catalytic alumina may also be prepared from the naturally occurring bauxite, which contains hydrated alumina, by removal of impurities such as iron and silicates which it contains and heating at a controlled temperature. This heating of the hydrated oxide from which the catalytic form is prepared, to drive off the hydrated water, is ordinarily termed activation.

The mixture of oxides is applied to the surface of the insert support by contacting the support, preferably by dipping, with a slurry of a mixture of the oxides in finely divided form in a liquid vehicle. Preferably, the film is deposited by the method described in United States Patent 2,580,806 of Louis E. Malina. According to this method, a slurry is prepared consisting of a mixture of finely divided alumina and beryllia or of alumina and zirconia suspended in an aqueous solution of a compound decomposable into a catalytic inorganic oxide. A slurry of either of these mixtures of oxides suspended in a concentrated aqueous solution of a heat-decomposable aluminum salt, especially aluminum nitrate, provides a particularly desirable medium from which to deposit the catalytic film.

From such a slurry, the film is deposited upon the support preferably by dipping it into the slurry, draining, drying to evaporate free moisture, and then heating at a temperature below about 1500° F. to decompose the compound originally present in solution into its catalytic oxide. For example, by dipping a metal support into a slurry consisting of finely divided catalytic alumina and beryllia suspended in a saturated aqueous solution of aluminum nitrate, a uniform deposit is produced on the surface of the metal. After drying, this deposit consists of a film of catalytic alumina and beryllia containing aluminum nitrate crystals deposited during evaporation of the free moisture. Upon heating this film to about 500° F. the aluminum nitrate decomposes into catalytic alumina.

In order to insure the production of a film of maximum hardness and of excellent adherence to the surface of the non-porous support, preferably the oxides are reduced to an extremely finely divided condition before being deposited on the surface of the support. This may be accomplished by subjecting them, either separately or in admixture, to a severe colloidization operation preferably in an attrition type colloid mill, using a wet grinding technique with the oxide suspended in an aqueous vehicle. A detailed description of this type of colloidizing operation is given in copending application Serial No. 444,275, filed July 19, 1954, by Eugene J. Houdry for Catalyst Manufacture.

The thickness of the catalytic film is of great importance. Essentially, the film of catalytic oxide should be very thin, and should not in any case exceed a thickness of about .015″. Films of greater thickness than this have a strong tendency to crack and to flake off the support. Preferably, the film is considerably thinner than .015″ and in general, may have a thickness of as little as about .0001″ and, for best results, not in excess of about .006″. When using a metal support, because of the wide differences in the coefficients of expansion of the metal and of the oxide, film thicknesses even considerably less than .006″ are preferred, the most satisfactory results with a metal support being generally obtained with films having a thickness of from about .0003″ to .0015″.

Alumina-beryllia or alumina-zirconia films having a thickness of the order described above may be produced satisfactorily by using the film applying techniques generally outlined above and which will be described more specifically in the examples which follow. By dipping a metal support for example, in a slurry consisting of a mixture of finely divided alumina and beryllia suspended in an aqueous solution of aluminum nitrate, a film approximately from .0001″ to .0005″ thick is deposited during the first dipping and drying operation and this film thickness can be increased by substantially the same amount by each subsequent dipping and drying operation. For most applications, from one to three successive coatings is sufficient.

The alumina-beryllia or alumina-zirconia film provides an excellent base or carrier for finely divided catalytically active metals to produce catalytic structures of outstanding properties. In particular, oxidation catalysts of superior flexibility, activity and durability may be produced by impregnating such a film with finely divided metals such as platinum, ruthenium, palladium, silver, chromium, copper, cobalt and nickel and combinations of these metals. Particularly excellent results are obtained with the use of platinum. Impregnation may be accomplished by methods well known in the art such as by impregnating the dry oxide film with an aqueous solution of a salt of the desired metal, and then decomposing the salt into the catalytically active metal, which is thereby deposited upon and within the oxide film in finely divided condition. The film may be impregnated with platinum, for example, by immersing the support carrying the film in a solution of chloroplatinic acid $$(H_2PtCl_6 \cdot 6H_2O)$$

drying and then heating to decompose the platinum salt thus depositing metallic platinum in finely divided form.

The amount of metal impregnating the oxide film should be small, and generally should not exceed 30% by weight of the weight of the oxide in the film. For many commercial applications the weight of the metal in the film will be considerably less than 30%, more often of the order of .2% to 5%. For example, oxidation catalysts of excellent activity may be prepared in which the oxide film contains about 0.4% to 2% by weight of platinum.

*Example 1*

A 22 gage (80% nickel–20% chromium) resistance wire was employed as the inert support. This wire, in the form of a closely wound flat coil was dipped into a slurry prepared as follows.

A calcined, catalytic grade alumina powder ground through about 300 mesh, manufactured by the Harshaw Chemical Company, was employed, this alumina having the following analysis:

| | |
|---|---|
| $Al_2O_3$ | 90.2% by weight. |
| $Na_2O$ | 0.43% by weight. |
| $Fe_2O_3$ | Less than 0.36% by weight. |
| $SiO_2$ | Less than 0.18% by weight. |
| Combined $H_2O$ | 9.1% by weight. |

This alumina was mixed with water in the proportion of 5 kilograms of alumina powder in sufficient water to give 8 litres of slurry. This water-alumina mixture was passed repeatedly through an attrition type colloid mill, being careful to maintain uniformity of the slurry by agitation. The colloid mill employed is manufactured by the Troy Engine & Machine Company, of Troy, Pennsylvania. It consists of a rotating disc and a stationary disc between which the slurry is pumped, with adjustable means for forcing these discs toward one another. The rotating disc revolves at a speed of 20,000 r.p.m. while the slurry is forced between it and the stator thereby subjecting the particles to hydraulic shear.

The original mixture was passed through this mill a total of eight times. With each successive pass through the mill, the adjustment for increasing the force with which the discs are biased toward one another was increased until colloidization was completed to the desired extent. The end-point of the colloidization procedure was determined by the fact that the alumina-water slurry (containing approximately equal weights of water and alumina) underwent a rather remarkable increase in viscosity, acquiring a smooth semi-self-sustaining consistency and showing very little tendency to separate into two phases even on prolonged standing. Particle size studies on this slurry by sedimentation technique and electron microscope examination shows that approximately 50% of the mass has been reduced to a particle size below one micron while there is less than a negligible weight percentage of particles of greater than 20 microns in size. The specific surface of the alumina particles calculated from particle size distribution curves is of the order of 80,000 square centimeters per cubic centimeter of packed volume assuming spherical particles and considering only the outside geometric area of each particle (that is, neglecting internal pore area).

A catalytic grade beryllia, calcined at a temperature of 1000°–1100° C., manufactured by the Brush Beryllium Company and having the following analysis was employed:

99.3% BeO
.05% Fe
0.12% Si
0.10% Ca

This beryllia was mixed with water and subjected to approximately the same type of colloidization operation as described above with reference to the alumina.

At the end of the colloidization operation, the water-alumina slurry contained about 44% solids by weight and the beryllia-water slurry contained about 56% solids by weight. These two slurries were mixed together and with aluminum nitrate crystals in the following proportions, which in the finished film produces substantially equi-molecular proportions of alumina and beryllia:

43.5 gms. BeO-water slurry (56% solids)
228.0 gms. $Al_2O_3$-water slurry (44% solids)
16.0 gms. $Al(NO_3)_3 \cdot 9H_2O$ crystals The coil of resistance wire was dipped into this mixture, removed, drained, and the excess slurry removed by vigorous shaking. The coil was connected to a source of electric current and heated electrically to incipient red heat about 1000° F. over a period of 1 to 2 minutes by gradually increasing the flow of current through the coil. This produced evaporation of free moisture leaving a film consisting of a mixture of catalytic alumina and beryllia on the wire having a thickness of about .0005". To increase the thickness of the film, the coil was again dipped into the mixture described above, removed, drained, shaken vigorously, and then heated electrically to dry the film.

The film thus produced, about .001" in thickness, was firmly adherent to the surface of the wire and was quite hard and resistant to chalking. To test its ability to withstand repeated expansions and contractions of the wire, the coil containing the catalytic coating was heated to red heat and then cooled 10,000 times with no detectable deterioration in the catalytic coating. Although the coated wire could not be sharply bent without dislodging the alumina-beryllia film, it could be flexed considerably without damaging the film.

An oxidation catalyst of excellent activity was prepared by dipping the coil containing the alumina-beryllia film into an aqueous solution of chloroplatinic and $$(H_2PtCl_6 \cdot 6H_2O)$$

containing 1% of platinum by weight. The coil was again heated slowly by passing electric current through the wire, bringing the coil to red heat. Complete decomposition of the platinum salt into metallic platinum was accomplished by heating the coil in a gas flame to bright redness. The catalytic structure thus produced has a great many applications as an oxidation catalyst and is particularly useful in catalytically oxidizing trace constituents in a gas stream, such as traces of organic smokes, and small concentrations of organic vapors such as those given off in the roasting or baking of meat or other food products.

Example II

A similar coil of wire as that used in Example I was provided with a film of beryllia-alumina using the same general procedure outlined in Example I except that the proportion of alumina was increased. In this case, the slurry in which the coil was dipped to deposit the film was compounded as follows:

5.3 gms. beryllia-water slurry (47.2% solids)
35.0 gms. alumina-water slurry (56.4% solids)
3.2% aluminum nitrate crystals $(Al(NO_3)_3 \cdot 9H_2O)$
8.6 gms. water The film of catalytic oxides, after drying and decomposition of the aluminum nitrate was likewise hard and firmly adherent to the surface of the wire making up the coil.

Example III

The procedure outlined in Example I was again repeated except that in this case the proportion of beryllia was increased over that used in Example I. In this case the slurry in which the coil was dipped for depositing the film was compounded as follows:

10.3 gms. BeO-water slurry (47.2% solids)
17.6 gms. $Al_2O_3$-water slurry (56.4% solids)
1.6 gms. aluminum nitrate crystals $(Al(NO_3)_3 \cdot 9H_2O)$
4.3 gms. water The catalytic film produced using this slurry was also hard and firmly adherent to the surface of the metal coil.

Example IV

A 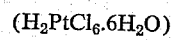" thick sheet of a metal alloy sold under the trade name Inconel X was employed as the support. This alloy has the following approximate analysis: 75% nickel, 15% chromium, 7% iron, 2.5% titanium, with small amounts of columbium, aluminum, silica and manganese. The same technique described in Example I were used. After dipping, it was allowed to drain, was dried and then heated to about 500° F. to decompose the aluminum nitrate into alumina. The alumina-beryllia film thus produced on the surface of the metal sheet was about .0005" in thickness, and was hard and firmly adherent to the surface of the metal. It was not easily scratched and was not removed from the surface by vigorous finger rubbing.

The alumina-beryllia film on the surface of the metal sheet was impregnated with about 1% to 2% by weight (based on the weight of the alumina-beryllia film) of platinum by dipping into a solution of chloroplatinic acid, after which the sheet was heated to decompose the platinum salt into metallic platinum. The resultant catalytic structure, when heated to about 700° and then exposed to city gas flowing over the surface of the catalytic film, caused the metal sheet to glow at red heat due to the oxidation of the city gas at the surface of the film in the presence of atmospheric air.

Example V

The procedure outlined in Example IV was repeated except that an additional coating of alumina-beryllia was applied over the first, increasing the total thickness of the film to .001". This film, when impregnated with platinum in the manner described in Example IV proved to be an equally effective oxidation catalyst.

Example VI

A length of resistance wire, similar to that used in Example I was provided with a zirconia-alumina film using the same general coating techniques outlined in Example I. In this case the slurry in which the coil was dipped to deposit the film was compounded as follows:

45 gms. $ZrO_2$-water slurry (69.0% solids)
44 gms. $Al_2O_3$-water slurry (56.4% solids)
4 gms. $Al(NO_3)_3 \cdot 9H_2O$ crystals A hard, uniform film of catalytic oxides was produced on the surface of the wire after drying and decomposition of the aluminum nitrate. The film had a thickness of .0005". When impregnated with platinum by dipping in a solution of chloroplatinic acid containing 1% platinum by weight, following the procedure outlined in Example I, an excellent oxidation catalyst was provided.

Example VII

Using the same general procedure outlined in Example I, a length of resistance wire was provided with a film of catalytic oxides. The slurry in which the coil was dipped to deposit the film was compounded as follows:

38.8 gms. ThO$_2$-water slurry (68.0% solids)
17.8 gms. ZrO$_2$-water slurry (69.0% solids)
20.0 gms. Al$_2$O$_3$-water slurry (56.4% solids)
4.0 gms. Al(NO$_3$)$_3$.9H$_2$O crystals A hard, adherent film of catalytic oxides, having a thickness of about .0005" was produced on the surface of the wire after drying and decomposition of the aluminum nitrate. When impregnated with a small amount of platinum as in Example I, the resultant structure proved to be an excellent oxidation catalyst.

As illustrated by this example, it is possible in some cases to include other catalytic oxides such as thoria in the mixture of alumina with beryllia or with zirconia to produce a hard, adherent film on a non-porous surface.

*Example VIII*

The procedure outlined in Example VII was repeated except that in this case a film was produced containing a relatively small amount of alumina, the alumina being introduced solely in the form of aluminum nitrate crystals. The slurry from which the film was deposited upon the surface of the Nichrome wire was compounded as follows:

38.8 gms. ThO$_2$=water slurry (68.0% solids)
17.8 gms. ZrO$_3$=water slurry (69.0% solids)
6.0 fims. Al(NO$_3$)$_3$.9H$_2$O crystals A hard, adherent, uniform film was produced, having a thickness of about .0005". Such a structure, in which the alumina-zirconia-thoria film was impregnated with platinum by the procedure outlined in Example I proved to be an excellent oxidation catalyst.

Attempts to produce satisfactory catalytic coatings using alumina, beryllia or zirconia alone, or other oxides alone or in combination, were unsuccessful. With alumina alone for example, using the same general techniques described above, adherence to the surface of the metal was poor, and where it was possible to produce a film at all, it was non-uniform and flaky in character. Using beryllia alone, a reasonably uniform film was produced. However, the beryllia film was soft and powdery and could be easily removed from the surface of the metal by light finger rubbing. Similarly unsuccessful attempts to produce a hard, adherent film were experienced using other combinations of oxides such as silica-alumina, magnesia-alumina, thoria-alumina and ceria-alumina combinations.

The invention makes possible the provision of catalytic structures of excellent properties suitable for use in many practical applications. A resistance element for example, coated with the film of beryllia and alumina and thereafter impregnated with a metal such as platinum, provides an excellent oxidation catalyst which has the advantage that the catalytic surface may be very quickly heated to the required reaction temperature by passing an electric current through the metal resistance element, thereby heating the catalytic film on its surface directly. This type of catalytic structure is the subject of United States Patent 2,731,641 of Eugene J. Houdry and Wilfred R. Adey. As an oxidation catalyst, such a structure may be employed to oxidize trace constituents in a gas stream such as traces of organic smoke, or organic gases or vapors. A flat coil of resistance wire such as that described in Example I provided with a film of alumina-beryllia of about .001" in thickness and impregnated with about 1% to 2% of a metal such as platinum or palladium, has been used very successfully for the oxidation of smoke, greases and traces of odorous organic material which are given off during the cooking of food, such as during the baking or roasting of meat. Oxidation of these constituents is effected by passing the air containing the trace contaminant over the catalyst heated electrically to a temperature of the order of about 700° F. to 800° F. The elimination of such constituents is substantially complete.

The invention also makes it possible to directly coat with catalyst the inner walls of metal lined combustion chambers, such as the type used in jet aircraft. The presence of the catalytic coating on the wall of the combustion chamber tends to improve combustion efficiency close to the surface of the wall where, because of the lower temperatures, combustion efficiency is relatively poor.

Many other applications are possible for this type of structure in promoting oxidation and other types of reactions, and it is not intended that the invention be limited to the particular applications described, nor to the specific examples which are given for the purpose of illustration, the invention being limited only by the scope of the appended claims.

This application is a continuation of copending application Serial No. 442,439, filed July 9, 1954, now abandoned, by Eugene J. Houdry and Wilfred M. Adey for Catalytic Structure.

We claim:

1. A catalytic structure comprising a support of a material which is essentially devoid of surface porosity and is a member selected from the group consisting of metal and glass, provided with a thin, adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1.

2. A catalytic structure comprising a support of a material which is essentially devoid of surface porosity and is a member selected from the group consisting of metal and glass provided with a thin, adherent, superficial film comprised of a mixture of catalytic alumina and catalytic beryllia.

3. A catalytic structure comprising a support of a material which is essentially devoid of surface porosity and is a member selected from the group consisting of metal and glass provided with a thin, adherent, superficial film comprised of a mixture of catalytic alumina with another oxide selected from the group consisting of catalytic beryllia and catalytic zirconia, the mole of the catalytic alumina to said other oxide being in the ratio of from 1:10 to10:1 and said film being impregnated with a finely divided catalytically active metal.

4. A catalytic structure adapted for promoting oxidation reaction comprising a support of a material which is essentially devoid of surface porosity and is a member selected from the group consisting of metal and glass provided with a thin, adherent, superficial film comprised of a mixture of catalytic alumina with another oxide selected from the group consisting of catalytic beryllia and catalytic zirconia, the mole ratio of of the catalytic alumina to said other oxide being in the range of from 1:10 to 10:1 and said film being impregnated with a finely divided catalytically active metal selected from the group consisting of platinum, ruthenium, palladium, silver, chromium, copper, nickel, cobalt and mixtures thereof.

5. A catalytic structure comprising a support of a material which is essentially devoid of surface porosity and is a member selected from the group consisting of metal and glass provided with an adherent, superficial film, comprised of a mixture of catalytic alumina with another oxide selected from the group consisting of catalytic beryllia and catalytic zirconia, having a thickness of from .0001" to .006", the mole ratio of the catalytic alumina to said other oxide being in the range of from 1:10 to 10:1.

6. A catalytic structure comprising a support of a material which is essentially devoid of surface porosity and is a member selected from the group consisting of metal and glass provided with an adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1 and said film having a thickness of from .0001" to .006" and being impregnated with a finely divided catalytically active metal.

7. A catalytic structure adapted for promoting oxidation reaction comprising a support of a material which is essentially devoid of surface porosity and is a member selected from the group consisting of metal and glass provided with an adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1 and said film having a thickness of from .0001" to .006", and being impregnated with a finely divided catalytically active metal selected from the group consisting of platinum, ruthenium, palladium, silver, chromium, copper, nickel, cobalt and mixtures thereof.

8. A catalytic structure comprising a support of a material which is essentially devoid of surface porosity and is a member selected from the group consisting of metal and glass provided with a thin, adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1 and said support being substantially free from metals detrimental to the activity of the catalytic film.

9. A catalytic structure comprising a metal support having a smooth, essentially non-porous surface provided with a thin, adherent, superficial film comprised of a mixture of catalytic alumina and catalytic beryllia, the mole ratio of the catalytic alumina to the catalytic beryllia being in the range of from 1:10 to 10:1 and said support being substantially free from metals detrimental to the activity of the catalytic film.

10. A catalytic structure comprising a metal support having a smooth, essentially non-porous surface provided with a thin, adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1 and said film being impregnated with a finely divided catalytically active metal, said support being substantially free from metals detrimental to the activity of the catalytic film.

11. A catalytic structure adapted for promoting oxidation reactions comprising a metal support having a smooth, essentially non-porous surface provided with a thin, adherent, superficial film comprised of a mixture of catalytic alumina with another oxide selected from the group consisting of catalytic beryllia and catalytic zirconia, the mole ratio of the catalytic alumina to said other oxide being in the range of from 1:10 to 10:1 and said film being impregnated with a finely divided catalytically active metal selected from the group consisting of platinum, ruthenium, palladium, silver, chromium, copper, nickel, cobalt and mixtures thereof, said support being substantially free from metals detrimental to the activity of the catalytic film.

12. A structure in accordance with claim 11 in which said film has a thickness of from .003" to .0015".

13. A catalytic structure comprising a metal support having a smooth, essentially non-porous surface provided with an adherent, superficial film comprised of a mixture of catalytic alumina and catalytic beryllia, said alumina, said beryllia and said aluminum nitrate being in an amount to provide a film containing a mole ratio of alumina to beryllia in the range of from 1:10 to 10:1 and said film having a thickness of from about .0003" to .0015" and being impregnated with from .2% to 5% by weight of platinum based on the weight of the alumina-beryllia film, said support being substantially free from metals detrimental to the activity of the catalytic film.

References Cited in the file of this patent
UNITED STATES PATENTS

| | | |
|---|---|---|
| 2,580,806 | Malina | Jan. 1, 1952 |
| 2,742,437 | Houdry | Apr. 17, 1956 |